United States Patent
Amano

(10) Patent No.: US 7,781,999 B2
(45) Date of Patent: Aug. 24, 2010

(54) POWER SOURCE APPARATUS FOR VEHICLE, VEHICLE AND METHOD OF CONTROLLING POWER SOURCE APPARATUS

(75) Inventor: Masaya Amano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 281 days.

(21) Appl. No.: 12/084,648

(22) PCT Filed: Dec. 26, 2006

(86) PCT No.: PCT/JP2006/326351
§ 371 (c)(1),
(2), (4) Date: May 7, 2008

(87) PCT Pub. No.: WO2007/086235
PCT Pub. Date: Aug. 2, 2007

(65) Prior Publication Data
US 2009/0230901 A1 Sep. 17, 2009

(30) Foreign Application Priority Data
Jan. 26, 2006 (JP) .............................. 2006-018055

(51) Int. Cl.
*H02P 27/00* (2006.01)
(52) U.S. Cl. ............... 318/400.3; 318/139; 318/442; 307/9.1; 363/23; 363/132; 903/902; 903/904
(58) Field of Classification Search ............ 318/139, 318/800, 442, 400.3; 307/9.1; 903/902, 903/904; 363/23, 132; 701/22; 320/109, 320/162; 180/68.1
See application file for complete search history.

(56) References Cited

U.S. PATENT DOCUMENTS

| 5,357,181 | A | 10/1994 | Mutoh et al. |
| 5,661,380 | A | 8/1997 | Obara et al. |
| 7,656,690 | B2 * | 2/2010 | Yamada et al. ................ 363/71 |
| 2004/0228150 | A1 | 11/2004 | Sato |
| 2006/0114702 | A1 * | 6/2006 | Yamada et al. ............... 363/132 |

FOREIGN PATENT DOCUMENTS

| JP | A-10-066383 | 3/1998 |
| WO | WO 2004/064235 A2 | 7/2004 |
| WO | WO 2005/049366 A1 | 6/2005 |

OTHER PUBLICATIONS

Jan. 15, 2010 Office Action issued in corresponding Chinese Patent Application No. 2006800517702 (with translation).

* cited by examiner

*Primary Examiner* — Paul Ip
(74) *Attorney, Agent, or Firm* — Oliff & Berridge, PLC

(57) ABSTRACT

A vehicle (100) includes a motor generator (MG) and an inverter (14) driving the motor generator (MG). A power source apparatus for the vehicle includes a battery (B) as an electric storage device, a step-up converter (12) stepping up a voltage of the electric storage device and supplying it to the inverter, and a controller (30) indicating a target step-up voltage in accordance with a target state of operation of the motor generator (MG) to the step-up converter (12). If it is determined that a current operation state signal of the motor generator (MG) is abnormal, the controller (30) increases the target step-up voltage to a maximum value. Preferably, the vehicle (100) further includes a resolver (20) detecting rotation speed of a rotor of motor generator (MG). The controller (30) determines that the operation state signal is abnormal if an output of the resolver (20) does not satisfy a prescribed condition.

11 Claims, 9 Drawing Sheets

POWER SOURCE APPARATUS FOR VEHICLE, VEHICLE AND METHOD OF CONTROLLING POWER SOURCE APPARATUS

TECHNICAL FIELD

The present invention relates to a power source apparatus for a vehicle and to a vehicle. Particularly, the present invention relates to a power source apparatus for a vehicle in which a power supply voltage of an electric storage device is stepped up to be supplied, as well as to the vehicle.

BACKGROUND ART

Recently, electric vehicles, hybrid vehicles and fuel-cell vehicles have attracting attention as environmentally friendly vehicles.

Such a vehicle mounts an electric storage device such as a high-voltage battery higher than 100V, to rotate motors and driving the vehicle using power from the electric storage device.

A configuration for stepping up a power supply voltage of the electric storage device and supplying the stepped-up voltage to an inverter driving a motor in such a vehicle has been studied.

Japanese Patent Laying-Open No. 10-066383 discloses a controller for driving a permanent magnet type synchronous motor having such a voltage step-up circuit, in which necessary voltage for achieving a target operating point is computed based on torque command and motor rotation, and the voltage is stepped up accordingly.

When the operating point of the motor determined by the torque and the rotation speed is abnormal, however, it is possible that an output voltage of a step-up converter becomes lower than back electromotive voltage of the motor. In such a situation, the motor would not operate normally but might cause regenerative braking.

DISCLOSURE OF THE INVENTION

An object of the present invention is to provide a power source apparatus of a vehicle capable of maintaining normal operation even if a target operating point of an electric motor cannot properly be detected.

In short, the present invention provides a power source apparatus for a vehicle including a first rotating electrical machine and an inverter driving the first rotating electrical machine, including: an electric storage device; a voltage converting unit stepping up a voltage of the electric storage device and supplying the stepped-up voltage to the inverter; and a controller indicating a target step-up voltage to the voltage converting unit in accordance with a first operation state signal representing a state of operation of the first rotating electrical machine. If the first operation state signal is determined to be abnormal, the controller determines the target step-up voltage to maintain operation of the voltage converting unit without using the first operation state signal.

Preferably, if the first operation state signal is determined to be abnormal, the controller sets the target step-up voltage to a highest settable value.

Preferably, the vehicle further includes a first rotation speed sensor detecting the rotation speed of a rotor of the first rotating electrical machine. The controller determines that the first operation state signal is abnormal, if an output of the first rotation speed sensor does not satisfy a prescribed condition.

Preferably, the first rotating electrical machine includes a coil. The vehicle further includes a current sensor detecting a current flowing through the coil. The controller determines that the first operation state signal is abnormal, if an output of the current sensor does not satisfy a prescribed condition.

Preferably, the vehicle further includes a second rotating electrical machine, an internal combustion engine, and a power split device mechanically coupled to a rotation shaft of the first rotating electrical machine, a rotation shaft of the second rotating electrical machine and a crank shaft of the internal combustion engine. The inverter includes first and second inverter units driving the first and second rotating electrical machines, respectively. If it is determined that operation state signal of one of the first and second rotating electrical machines is abnormal, the controller estimates a correct value of the operation state signal of the one of the first and second rotating electrical machines based on the operation state signal of the other one of the first and second rotating electrical machines and a signal representing a state of operation of the internal combustion engine, and determines the target step-up voltage based on the estimated value.

More preferably, the vehicle further includes a first rotation speed sensor detecting the rotation speed of a rotor of the first rotating electrical machine, a second rotation speed sensor detecting the rotation speed of a rotor of the second rotating electrical machine, and a third rotation speed sensor detecting the rotation speed of a crank shaft of the internal combustion engine. The power split device includes a planetary gear mechanism in which rotation of one shaft is forcibly determined when rotations of two other shafts are determined. The controller estimates, using an output of one of the first and second rotation speed sensors and an output of the third rotation speed sensor, an output of the other one of the first and second rotation speed sensors.

Preferably, the vehicle includes a plurality of rotating electrical machines, and the first rotating electrical machine is one of the plurality of rotating electrical machines. The inverter includes a plurality of inverter units driving the plurality of rotating electrical machines respectively. The voltage converting unit steps up a voltage of the electric storage device and supplies a common stepped-up voltage to the plurality of inverter units. The controller calculates a highest voltage among a plurality of voltages required by the plurality of rotating electrical machines respectively, based on states of operations of the plurality of rotating electrical machines, and indicates the highest voltage as a target step-up voltage to the voltage converting unit. If it is determined that any one of a plurality of operation state signals respectively representing states of operations of the plurality of rotating electrical machines is abnormal, the controller increases the target step-up voltage to a highest settable value.

More preferably, the vehicle includes a plurality of rotation speed sensors respectively detecting rotation speeds of rotors of the plurality of rotating electrical machines. If an output of at least one of the plurality of rotation speed sensors does not satisfy a prescribed condition, the controller determines that an operation state signal of the corresponding rotating electrical machine is abnormal.

Preferably, the vehicle includes a detecting unit detecting vehicle speed, and a plurality of rotating electrical machines. The first rotating electrical machine rotates in coordination with the vehicle speed and it is one of the plurality of rotating electrical machines. The inverter includes a plurality of inverter units driving the plurality of rotating electrical machines respectively. The voltage converting unit steps up a voltage of the electric storage device and supplies a common stepped-up voltage to the plurality of inverter units. The controller calculates the highest voltage among a plurality of voltages required by the plurality of rotating electrical machines based on states of operations of the plurality of rotating electrical machines, and indicates the highest voltage as the target step-up voltage to the voltage converting unit. If it is determined that the first operation state signal is abnormal, the controller estimates a correct value of the first operation state signal from an output of the detecting unit and uses the estimated value in determining the target step-up voltage.

According to another aspect, the present invention provides a vehicle, including: a first rotating electrical machine, an inverter driving the first rotating electrical machine, and a power source apparatus. The power source apparatus includes an electric storage device, a voltage converting unit stepping up a voltage of the electric storage device and supplying it to the inverter, and a controller indicating a target step-up voltage to the voltage converting unit in accordance with a first operation state signal representing a state of operation of the first rotating electrical machine. If it is determined that the first operation state signal is abnormal, the controller determines the target step-up voltage to maintain operation of the voltage converting unit without using the first operation state signal.

According to a further aspect, the present invention provides a method of controlling a power source apparatus for a vehicle including a first rotating electrical machine and an inverter driving the first rotating electrical machine. The power source apparatus includes an electric storage device, and a voltage converting unit stepping up a voltage of the electric storage device and supplying the stepped-up voltage to the inverter. The control method includes the steps of: indicating a target step-up voltage to the voltage converting unit in accordance with a first operation state signal representing a state of operation of the first rotating electrical machine; and if it is determined that the first operation state signal is abnormal, determining the target step-up voltage to maintain an operation of the voltage converting unit without using the first operation state signal.

Preferably, in the step of maintaining the operation of the voltage converting unit, if the first operation state signal is determined to be abnormal, the target step-up voltage is set to a highest settable value.

Preferably, the vehicle further includes a first rotation speed sensor detecting rotation speed of a rotor of the first rotating electrical machine. The control method further includes the step of determining, when an output of the first rotation speed sensor does not satisfy a prescribed condition, that the first operation state signal is abnormal.

Preferably, the first rotating electrical machine includes a coil. The vehicle further includes a current sensor detecting a current flowing through the coil. The control method further includes the step of determining that the first operation state signal is abnormal when an output of the current sensor does not satisfy a prescribed condition.

Preferably, the vehicle further includes a second rotating electrical machine, an internal combustion engine, and a power split device mechanically coupled to a rotation shaft of the first rotating electrical machine, a rotation shaft of the second rotating electrical machine and a crank shaft of the internal combustion engine. The inverter includes first and second inverter units driving the first and second rotating electrical machines, respectively. The control method further includes the steps of: estimating, if it is determined that operation state signal of one of the first and second rotating electrical machines is abnormal, a correct value of the operation state signal of the one of the first and second rotating electrical machines based on the operation state signal of the other one of the first and second rotating electrical machines and a signal representing a state of operation of the internal combustion engine; and determining the target step-up voltage based on the estimated value.

More preferably, the vehicle further includes a first rotation speed sensor detecting the rotation speed of a rotor of the first rotating electrical machine, a second rotation speed sensor detecting the rotation speed of a rotor of the second rotating electrical machine, and a third rotation speed sensor detecting rotation speed of a crank shaft of the internal combustion engine. The power split device includes a planetary gear mechanism in which rotation of one shaft is forcibly determined when rotations of two other shafts are determined. In the step of estimating, using an output of one of the first and second rotation speed sensors and an output of the third rotation speed sensor, an output of the other one of the first and second rotation speed sensors is estimated.

Preferably, the vehicle includes a plurality of rotating electrical machines, and the first rotating electrical machine is one of the plurality of rotating electrical machines. The inverter includes a plurality of inverter units driving the plurality of rotating electrical machines, respectively. The voltage converting unit steps up a voltage of the electric storage device and supplies a common stepped-up voltage to the plurality of inverter units. The control method further includes the steps of: calculating a highest voltage among a plurality of voltages required by the plurality of rotating electrical machines, respectively, based on states of operations of the plurality of rotating electrical machines, and indicating the highest voltage as a target step-up voltage to the voltage converting unit; and if it is determined that any of a plurality of operation state signals respectively representing states of operations of the plurality of rotating electrical machines is abnormal, increasing the target step-up voltage to a highest settable value.

More preferably, the vehicle includes a plurality of rotation speed sensors respectively detecting rotation speeds of rotors of the plurality of rotating electrical machines. The control method further includes the step of determining, if an output of at least one of the plurality of rotation speed sensors does not satisfy a prescribed condition, that an operation state signal of the corresponding rotating electrical machine is abnormal.

Preferably, the vehicle includes a detecting unit detecting vehicle speed, and a plurality of rotating electrical machines. The first rotating electrical machine rotates in coordination with the vehicle speed and is one of the plurality of rotating electrical machines. The inverter includes a plurality of inverter units driving the plurality of rotating electrical machines, respectively. The voltage converting unit steps up a voltage of the electric storage device and supplies a common stepped-up voltage to the plurality of inverter units. The control method further includes the steps of: calculating the highest voltage among a plurality of voltages required by the plurality of rotating electrical machines based on states of operations of the plurality of rotating electrical machines, and indicating the highest voltage as the target step-up voltage to the voltage converting unit; and if it is determined that the first operation state signal is abnormal, estimating a correct value of the first operation state signal from an output of the detecting unit and determining the target step-up voltage using the estimated value.

According to the present invention, a power source apparatus for a vehicle can be realized, which can maintain normal operation even when the target operating point of the electric motor cannot properly be detected.

BEST MODES FOR CARRYING OUT THE INVENTION

Figure 1:
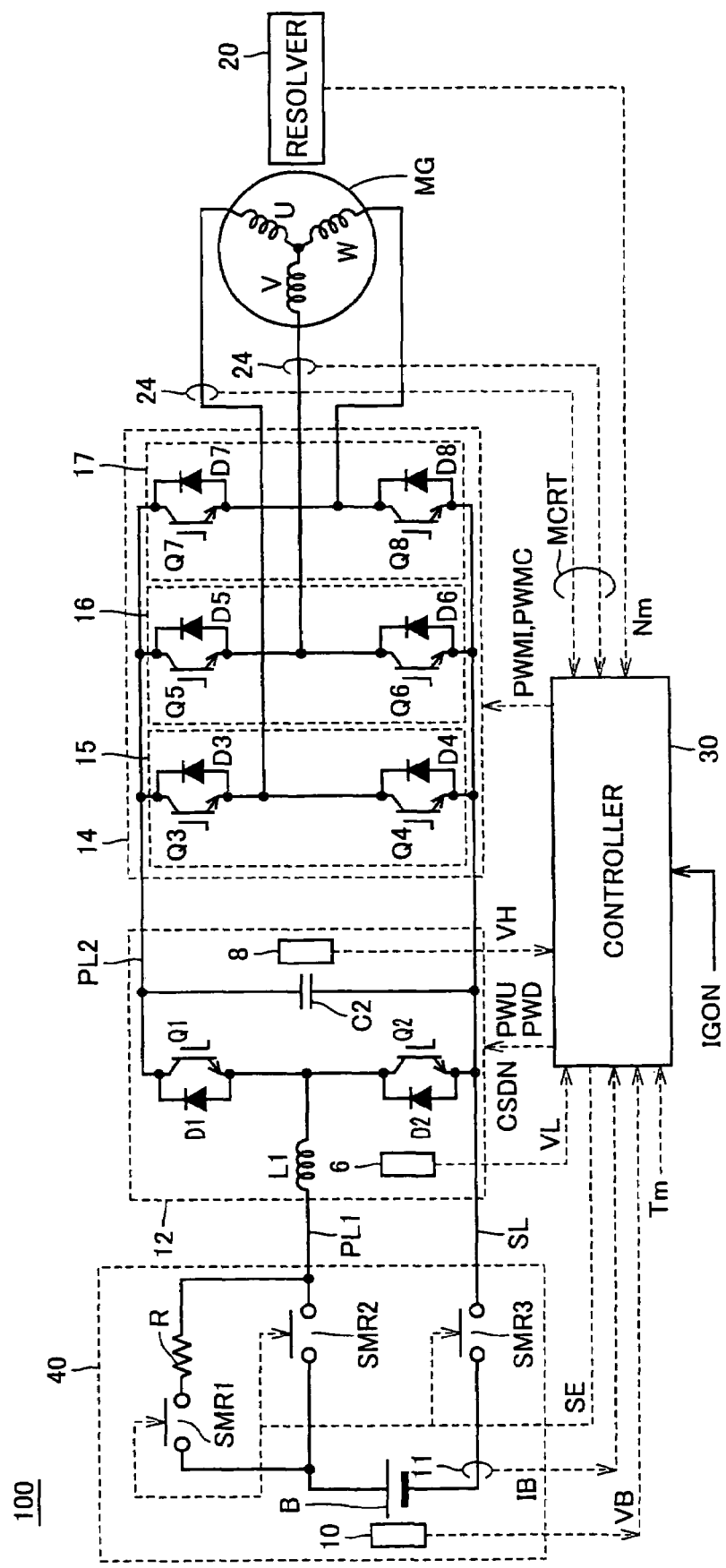
FIG. 1 is a circuit diagram showing a configuration related to motor generator control of a vehicle 100 in accordance with Embodiment 1 of the present invention.

In the following, the present invention will be described in detail with reference to the figures. In the figures, the same or corresponding portions are denoted by the same reference characters and description thereof will not be repeated.

Embodiment 1

FIG. 1 is a circuit diagram showing a configuration related to motor generator control of a vehicle 100 in accordance with Embodiment 1 of the present invention.

Referring to FIG. 1, vehicle 100 includes a battery unit 40, a motor generator MG, an inverter 14 provided corresponding to motor generator MG, a step-up converter 12, a resolver 20, a current sensor 24, a controller 30 and wheels, not shown.

Battery unit 40 and step-up converter 12 are electrically connected by a power supply line PL1 and a ground ling SL.

Battery unit 40 includes a battery B, a system main relay SMR3 connected between a negative electrode of battery B and the ground line SL, a system main relay SMR2 connected between a positive electrode of battery B and the power supply line PL1, and a system main relay SMR1 and a limiting resistor R connected in series between the positive electrode of battery B and the power supply line PL1. State of conduction/non-conduction of system main relays SMR1 to SMR3 is controlled in accordance with a control signal SE applied from controller 30.

Battery unit 40 further includes a voltage sensor 10 measuring a voltage VB between terminals of battery B, and a current sensor 11 detecting a current IB flowing to battery B.

As battery B, a nickel hydride or lithium ion secondary battery or a fuel cell may be used. Further, as an electric storage device, a capacitor of large capacity such as an electric double layer capacitor may be used in place of battery B.

Step-up converter 12 steps up the voltage between the ground line SL and the power supply line PL1 and supplies the result to inverter 14 through the ground line SL and a power supply line PL2. Inverter 14 converts the DC voltage supplied from step-up converter 12 to three-phase AC voltage and outputs it to motor generator MG.

Step-up converter 12 includes a reactor L1 having one end connected to the power supply line PL1, IGBT elements Q1 and Q2 connected in series between the power supply line PL2 and the ground line SL, diodes D1 and D2 connected in parallel with IGBT elements Q1 and Q2 respectively, a smoothing capacitor C2, a voltage sensor 6 detecting a voltage VL between the power supply line PL1 and the ground line SL, and a voltage sensor 8 detecting a voltage VH between the power supply line PL2 and the ground line SL. Smoothing capacitor C2 smoothes the voltage stepped-up by step-up converter 12.

The other end of reactor L1 is connected to the emitter of IGBT element Q1 and to the collector of IGBT element Q2. Diode D1 has its cathode connected to the collector of IGBT element Q1, and its anode connected to the emitter of IGBT element Q1. Diode D2 has its cathode connected to the collector of IGBT element Q2 and its anode connected to the emitter of IGBT element Q2.

Inverter 14 converts the DC voltage output from step-up converter 12 to three-phase AC voltage and outputs it to motor generator MG driving the wheels. Further, in regenerative braking, inverter 14 returns power generated by motor generator MG to step-up converter 12. At this time, step-up converter 12 is controlled by controller 30 such that it operates as a stepping-down circuit.

Inverter 14 includes a U-phase arm 15, a V-phase arm 16, and a W-phase arm 17. U-phase, V-phase and W-phase arms 15, 16 and 17 are connected in parallel between the power supply line PL2 and the ground line SL.

U-phase arm 15 includes IGBT elements Q3 and Q4 connected in series between the power supply line PL2 and the ground ling SL, and diodes D3 and D4 connected in parallel with IGBT elements Q3 and Q4, respectively. Diode D3 has its cathode connected to the collector of IGBT element Q3, and its anode connected to the emitter of IGBT element Q3. Diode D4 has its cathode connected to the collector of IGBT element Q4, and its anode connected to the emitter of IGBT element Q4.

V-phase arm 16 includes IGBT elements Q5 and Q6 connected in series between the power supply line PL2 and the ground line SL, and diodes D5 and D6 connected in parallel with IGBT elements Q5 and Q6, respectively. Diode D5 has its cathode connected to the collector of IGBT element Q5, and its anode connected to the emitter of IGBT element Q5. Diode D6 has its cathode connected to the collector of IGBT element Q6 and its anode connected to the emitter of IGBT element Q6.

W-phase arm 17 includes IGBT elements Q7 and Q8 connected in series between the power supply line PL2 and the ground line SL, and diodes D7 and D8 connected in parallel with IGBT elements Q7 and Q8, respectively. Diode D7 has its cathode connected to the collector of IGBT element Q7 and its anode connected to the emitter of IGBT element Q7. Diode D8 has its cathode connected to the collector of IGBT element Q8 and its anode connected to the emitter of IGBT element Q8.

Motor generator MG is a three-phase, permanent magnet synchronous motor, and three coils of U, V and W phases each have one end connected together to a neutral point. The other end of U-phase coil is connected to a connection node of IGBT elements Q3 and Q4. The other end of V-phase coil is connected to the connection node of IGBT elements Q5 and Q6. The other end of W-phase coil is connected to the connection node of IGBT elements Q7 and Q8.

Current sensor 24 detects a current flowing through motor generator MG as a motor current value MCRT, and outputs the motor current value MCRT to controller 30.

Controller 30 receives a torque command value Tm for the motor generator MG, values of voltages VB, VL and VH and of current IB, the motor current value MCRT and an activation signal IGON. Further, controller 30 receives an output of resolver 20 and calculates motor rotation speed Nm of motor generator MG.

Here, voltage VB is a voltage of battery B, which is measured by voltage sensor 10. Current IB is a current flowing through battery B, which is measured by current sensor 11. Voltage VL is a voltage before step-up by step-up converter 12, which is measured by voltage sensor 6. Voltage VH is a voltage after step-up by step-up converter 12, which is measured by voltage sensor 8.

Controller 30 outputs a control signal PWU instructing step-up converter 12 to step up the voltage, a control signal PWD instructing stepping down of the voltage, and a signal CSDN instructing operation inhibition.

Further, controller 30 drives IGBT elements Q3 to Q8 such that inverter 14 converts the DC voltage VH as an output of step-up converter 12 to an AC voltage for driving motor generator MG, and drives IGBT elements Q3 to Q8 such that an AC voltage generated by motor generator MG is converted to a DC voltage and returned to the side of step-up converter 12.

Battery unit 40, step-up converter 12 and controller 30 constitute a power source apparatus for the vehicle, supplying power to inverter 14 and motor generator MG as loads of the vehicle.

Figure 2:
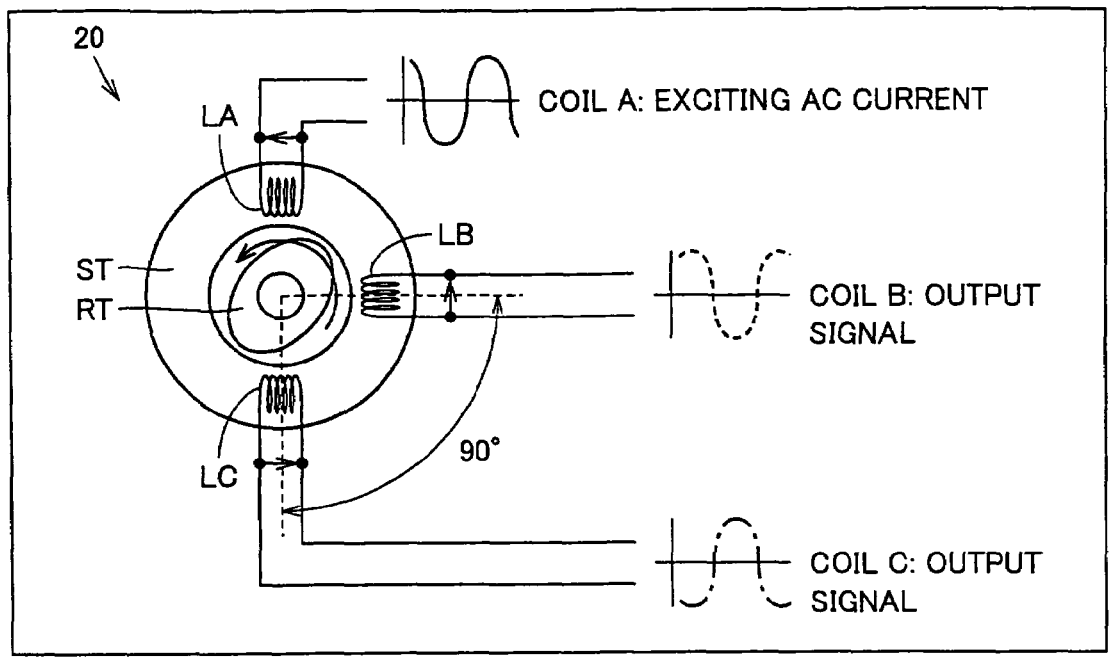
FIG. 2 is an illustration showing configuration and operation of a resolver 20 of FIG. 1.

FIG. 2 is an illustration showing configuration and operation of a resolver 20 of FIG. 1.

Referring to FIG. 2, resolver 20 includes a stator ST, a rotor RT, and coils LA, LB and LC arranged at the stator portion.

Stator ST has three coils LA, LB and LC arranged therein, and coils LB and LC are arranged, each shifted electrically by 90°. Rotor RT has an elliptical shape, and when rotor RT rotates, gap length around the coils of stator ST and rotor RT varies. When an AC current for excitation is caused to flow to coil LA, AC outputs having amplitudes corresponding to the position of rotor RT are generated at coils LB and LC, respectively. From the difference between the outputs of coils LB and LC, controller 30 can detect the rotor position. By operating an amount of positional change in a prescribed time period, controller 30 can calculate the rotation speed of rotor RT.

Figure 3:
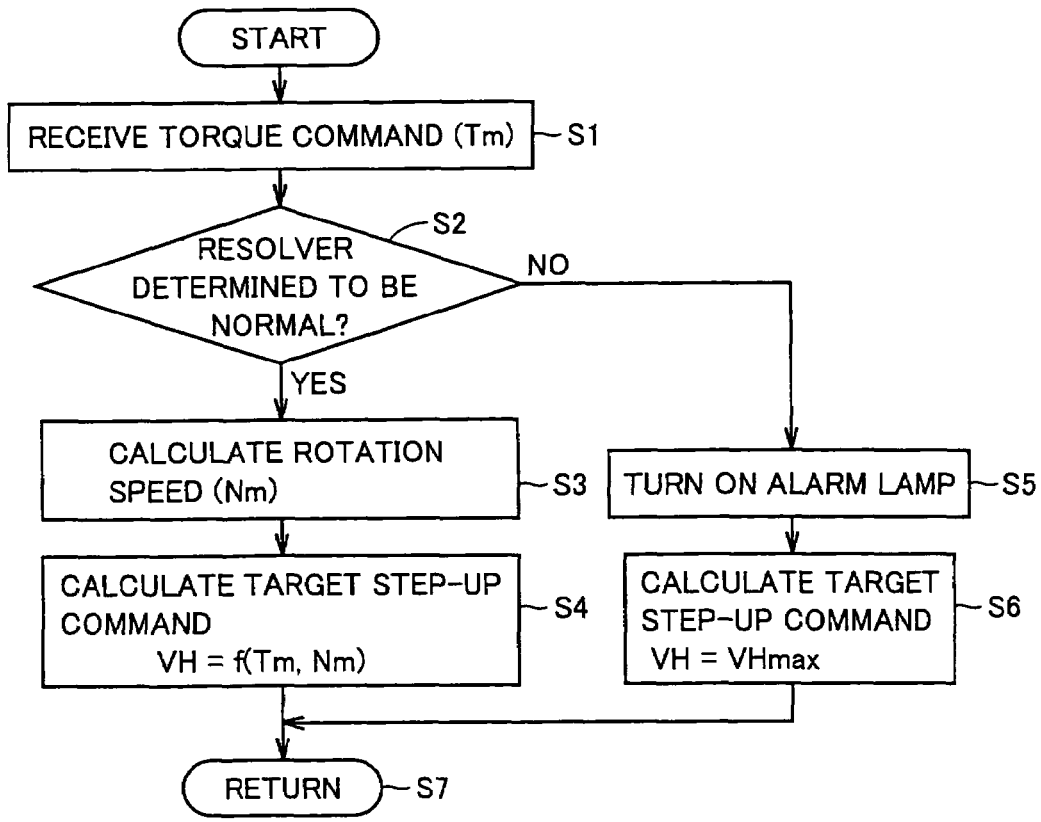
FIG. 3 is a flowchart representing a target step-up command calculating process of a step-up converter executed by the controller of FIG. 1.

FIG. 3 is a flowchart representing a target step-up command calculating process of the step-up converter executed by the controller of FIG. 1. The process of this flowchart is called from the main routine and executed at every prescribed time period or every time prescribed conditions are satisfied.

Referring to FIG. 3, first, when the process starts, a torque command Tm is received at step S1. Next, at step S2, whether an operation of a resolver detecting the rotation speed of the motor is normal or not is determined.

Resolver normalcy determination is made, for example, by confirming whether a signal from the resolver is fixed by disconnection or the like, or by confirming whether a relation of $\sin^2\theta + \cos^2\theta = 1$, that is, $B^2 + C^2 = 1$ holds between the signals B and C detected at coils LB and LC of FIG. 2, respectively.

When the determination on the resolver at step S2 is normal, the process proceeds to step S3. At step S3, a process of calculating the motor rotation speed Nm using the resolver output is performed. Then, the process proceeds to step S4.

At step S4, a target step-up voltage VH of the step-up converter is calculated with reference to a prescribed map, based on the torque command value Tm and motor rotation speed Nm.

Figure 4:
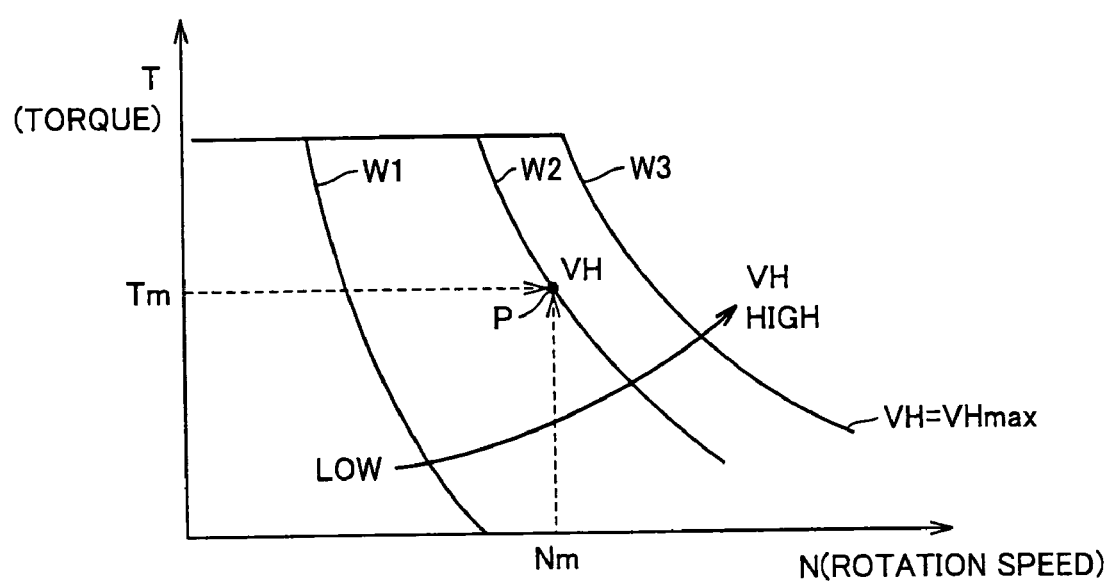
FIG. 4 is a map for calculating a target step-up voltage VH used at step S4 of FIG. 3.

FIG. 4 is the map for calculating the target step-up voltage VH used at step S4 of FIG. 3.

As shown in FIG. 4, the target step-up voltage VH of the step-up converter is mapped with the ordinate representing torque command T and the abscissa representing motor rotation speed N. The target step-up voltage VH is defined to be higher in the order of line W1, line W2 and line W3. When the motor rotation speed N is Nm and the torque command value is Tm, an operating point P is found on line W2, and thus, the target step-up voltage VH is determined.

As the step-up voltage of step-up converter 12 is changed in accordance with the torque or the rotation speed, highly efficient running becomes possible. Specifically, assuming that the maximum torque control is being executed with the power supply voltage kept constant, the back electromotive voltage exceeds the power supply voltage when the motor rotation speed increases. In order to prevent deterioration of controllability, it is necessary to perform field-weakening control in which the maximum torque control is stopped and the phase of current waveform is advanced. Field-weakening control leads to insufficient torque at a high speed range and, therefore, it is rather preferable to step up the power supply voltage to be supplied to the motor to be larger than the back electromotive voltage. Excessive step-up, however, is not preferred, as the voltage step-up operation causes loss in step-up converter 12. When the step-up voltage is determined using a map such as shown in FIG. 4, the voltage can be stepped up by the necessary amount by step-up converter 12, providing necessary torque and allowing efficient running.

Again referring to FIG. 3, if it is determined at step S2 that resolver determination is abnormal, the process proceeds to step S5. At step S5, an alarm lamp is turned on to inform the driver of abnormality of the resolver as the rotation speed sensor. In place of the alarm lamp, an indication may be given on a navigation display, or a voice output of alarm message may be given. Thereafter, the process proceeds to step S6, in which the target step-up voltage VH is set to the maximum value VHmax of the expected range of use, as the target step-up command calculating process.

Based on the description above, Embodiment 1 will be summarized again with reference to FIG. 1.

Vehicle 100 includes motor generator MG and inverter 14 driving motor generator MG. The power source apparatus for the vehicle includes battery B as an electric storage device, step-up converter 12 stepping up the voltage of the electric storage device and supplying the result to the inverter, and controller 30 indicating target step-up voltage to step-up converter 12, in accordance with the target state of operation of motor generator MG. When it is determined that the current operation state signal of motor generator MG is abnormal, controller 30 increases the target step-up voltage to the maximum value.

Preferably, vehicle 100 further includes resolver 20 detecting the rotation speed of the rotor in motor generator MG. Controller 30 determines that an operation state signal is abnormal when the output of resolver 20 does not satisfy prescribed conditions.

As described above, in Embodiment 1, when the target operating point of the motor is abnormal, the output voltage of the step-up converter is increased to the maximum voltage. Consequently, the output voltage of the step-up converter does not become lower than the back electromotive voltage of the motor, and therefore, erroneous regenerative braking of the motor or deterioration of controllability can be prevented.

The operating point of the motor is determined by the motor rotation speed and the target torque. The torque may not assume a normal value when the output of current sensor 24 is abnormal. Therefore, by replacing step S2 of the flowchart of FIG. 3 with a determination as to whether the output determination of current sensor 24 is normal or not and by replacing step S3 with calculation of a target torque Tm, it becomes possible to attain similar effects by increasing the step-up command value to the maximum value, even when the current sensor is abnormal.

For such a purpose, motor generator MG includes a coil, and vehicle 100 further includes current sensor 24 detecting a current flowing through the coil. Controller 30 determines that the operation state signal is not normal when an output of current sensor 24 does not satisfy prescribed conditions.

Embodiment 2

In Embodiment 1, it is described that the target step up command of the step-up converter is increased to the maximum when the rotation speed of the driving motor cannot correctly be detected. If the motor rotation speed can be correctly calculated by using a signal other than the output of the resolver that seems to be defective, the target step-up voltage VH may be calculated based thereon, using the map of FIG. 4.

Figure 5:
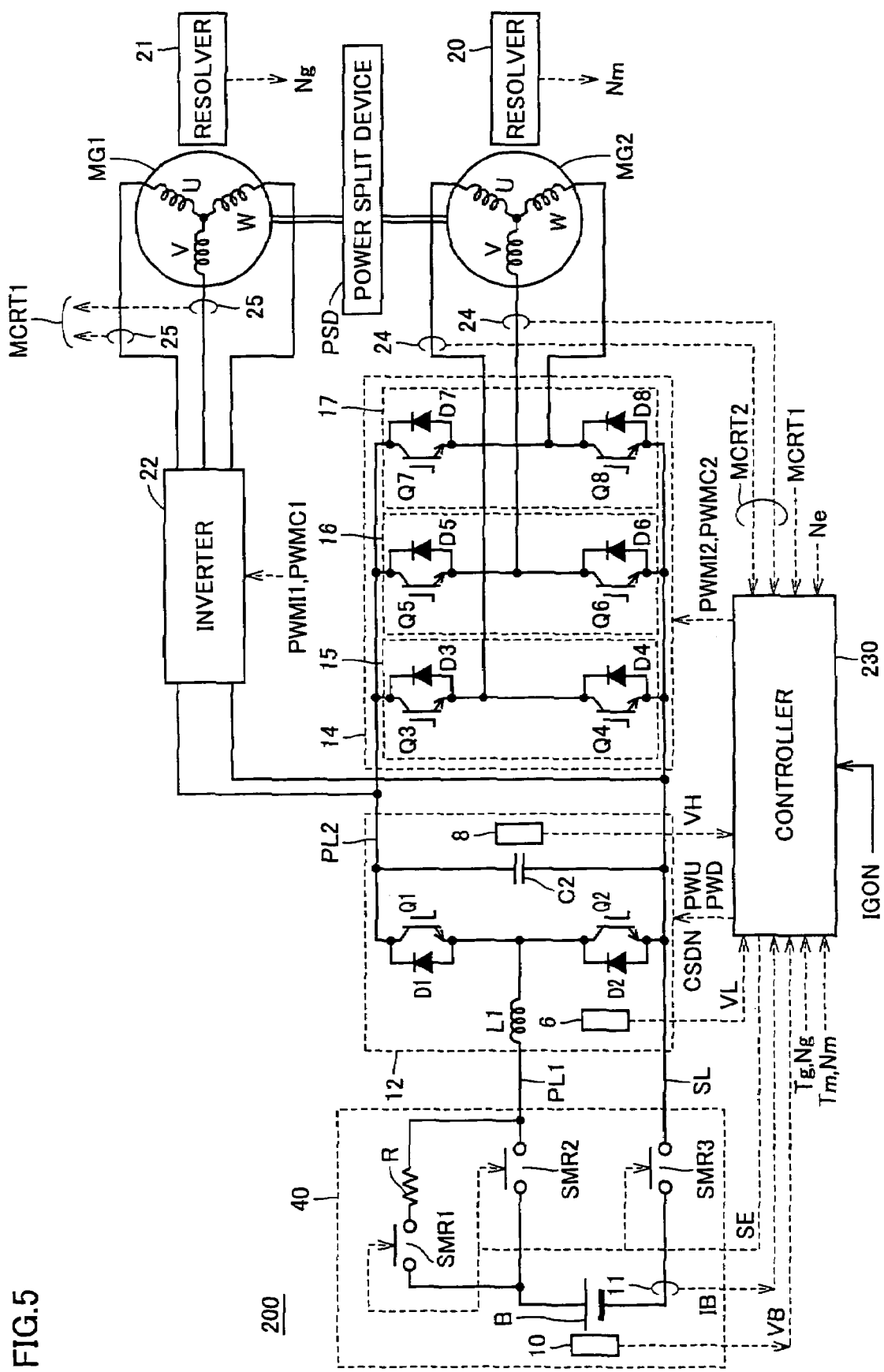
FIG. 5 is a circuit diagram representing a configuration of a vehicle 200 in accordance with Embodiment 2.

FIG. 5 is a circuit diagram representing a configuration of a vehicle 200 in accordance with Embodiment 2. Vehicle 200 is a hybrid vehicle using both a driving motor and an engine.

Referring to FIG. 5, vehicle 200 has a configuration corresponding to that of vehicle 100 described with reference to FIG. 1, with motor generator MG replaced by a motor generator MG2 and controller 30 replaced by a controller 230. Vehicle 200 further includes a motor generator MG1, an inverter 22 provided corresponding to motor generator MG1, a current sensor 25 detecting a current MCRT1 flowing through a stator coil of motor generator MG1, a resolver 21 detecting rotation speed Ng of motor generator MG1, and a power split device PSD.

Specifically, vehicle 200 includes battery unit 40, motor generators MG1 and MG2, power split device PSD, inverters 22 and 14 provided corresponding to motor generators MG1 and MG2, respectively, step-up converter 12, resolvers 20 and 21, current sensors 24 and 25, controller 230, and an engine and wheels, not shown.

Battery unit 40 and step-up converter 12 are electrically connected by the power supply line PL1 and the ground line SL.

Internal configuration of battery unit 40 is the same as that of vehicle 100 shown in FIG. 1 and, therefore, description thereof will not be repeated.

Step-up converter 12 steps up the voltage between the ground line SL and the power supply line PL1, and supplies the resulting voltage to inverters 14 and 22 through the ground line SL and the power supply line PL2. Inverter 14 converts the DC voltage supplied from step-up converter 12 to a three-phase AC voltage and outputs it to motor generator MG2. Inverter 22 converts the DC voltage supplied from step-up converter 12 to three-phase AC voltage and outputs it to motor generator MG1.

Internal configuration of step-up converter 12 is the same as that of vehicle 100 shown in FIG. 1 and, therefore, description thereof will not be repeated.

Inverter 14 converts the DC voltage output from step-up converter 12 to three-phase AC voltage and outputs the same to motor generator MG2 driving the wheels. Further, in regenerative braking, inverter 14 returns the power generated by motor generator MG2 to step-up converter 12. At this time, step-up converter 12 is controlled by controller 230 such that it operates as a stepping down circuit.

Internal configuration of inverter 14 is the same as that of vehicle 100 shown in FIG. 1 and, therefore, description thereof will not be repeated.

Motor generator MG2 is a three-phase, permanent magnet synchronous motor, in which three coils of U, V and W phases each have one end connected together to a neutral point. The other end of the U-phase coil is connected to a connection node of IGBT elements Q3 and Q4. The other end of the V-phase coil is connected to a connection node of IGBT elements Q5 and Q6. The other end of the W-phase coil is connected to a connection node of IGBT elements Q7 and Q8.

Current sensor 24 detects a current flowing through motor generator MG2 as a motor current value MCRT2, and outputs the motor current value MCRT2 to controller 230.

Inverter 22 is connected to step-up converter 12 in parallel with inverter 14. Inverter 22 converts the DC voltage output from step-up converter 12 to three-phase AC voltage and outputs the same to motor generator MG1. Receiving the stepped-up voltage from step-up converter 12, inverter 22 drives motor generator MG1, for example, to start the engine.

Further, inverter 22 returns the power generated by motor generator MG1 by the rotary torque transmitted from a crank shaft of the engine to step-up converter 12. At this time, step-up converter 12 is controlled by controller 230 such that it operates as a voltage stepping down circuit.

Though not shown, internal configuration of inverter 22 is the same as that of inverter 14 and, therefore, detailed description thereof will not be repeated.

Motor generator MG1 is a three-phase, permanent magnet synchronous motor, in which three coils of U, V and W phases each have one end connected together to a neutral point. The other end the coil of each phase is connected to inverter 22.

Current sensor 25 detects the current flowing through motor generator MG1 as a motor current value MCRT1, and outputs the motor current value MCRT1 to controller 230.

Controller 230 receives torque command values Tm and Tg, motor rotation speeds Nm and Ng, engine speed Ne, values of voltages VB, VL and VH and of current IB, the motor current values MCR1 and MCR2, and an activation signal IGON.

Here, torque command value Tg, motor rotation speed Ng and motor current value MCRT1 are related to motor generator MG1, and torque command value Tm, motor rotation speed Nm and motor current value MCRT2 are related to motor generator MG2.

Further, voltage VB is the voltage of battery B, and current IB is the current flowing through battery B. Voltage VL is the voltage before step-up by step-up converter 12, and voltage VH is the voltage after step-up by step-up converter 12.

Controller 230 outputs a control signal PWU instructing step-up converter 12 to step up the voltage, a control signal PWD to step down the voltage, and a signal CSDN instructing an operation inhibition.

Further, controller 230 outputs, to inverter 14, a driving instruction PWMI2 for converting the DC voltage VH as an output of step-up converter 12 to an AC voltage for driving motor generator MG2, and a regeneration instruction PWMC2 for converting an AC voltage generated by motor generator MG2 to a DC voltage and returning the same to the side of step-up converter 12.

Further, controller 230 outputs, to inverter 22, a driving instruction PWMI1 for converting the DC voltage VH as an output of step-up converter 12 to an AC voltage for driving motor generator MG1, and a regeneration instruction PWMC1 for converting an AC voltage generated by motor generator MG1 to a DC voltage and returning the same to the side of step-up converter 12.

Battery unit 40, step-up converter 12 and controller 230 constitute the power source apparatus for the vehicle, for supplying power to inverters 14 and 22 and motor generators MG1 and MG2 as loads of the vehicle.

Figure 6:
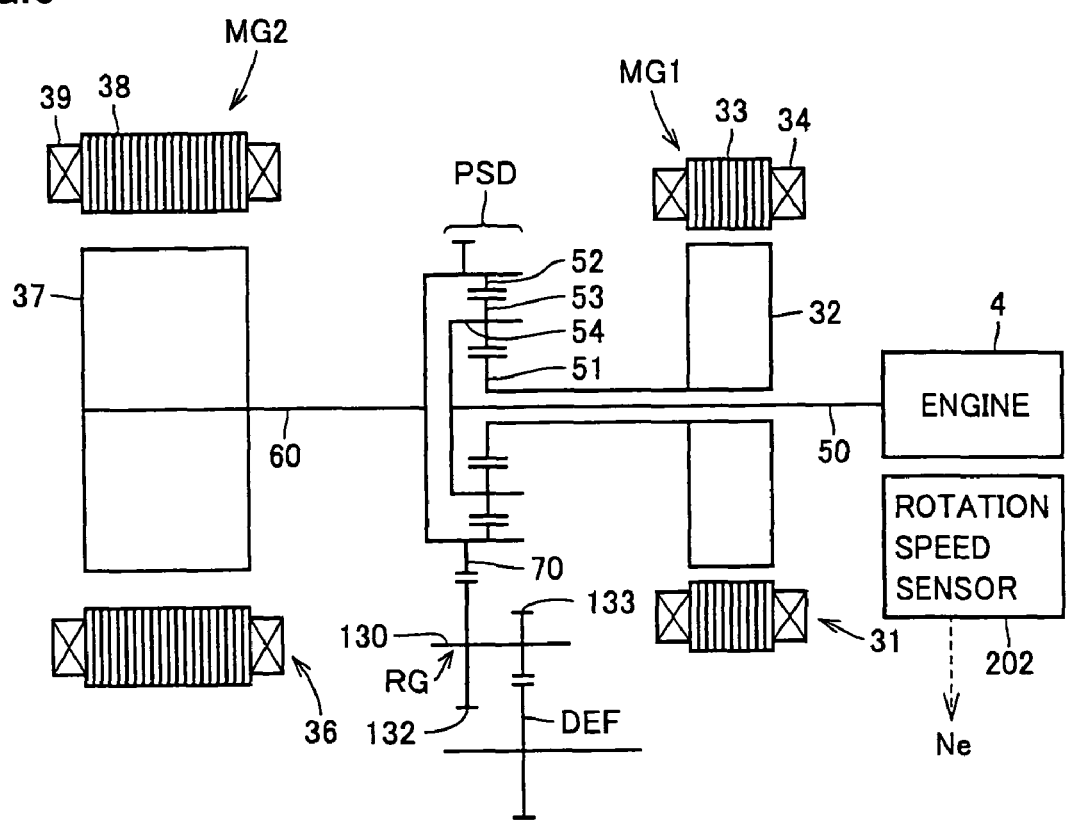
FIG. 6 is a schematic diagram illustrating details of a power split device (PSD) of FIG. 5.

FIG. 6 is a schematic diagram illustrating details of the power split device of FIG. 5.

Referring to FIG. 6, a crank shaft 50 of an engine 4, a rotor 32 of motor generator MG1 and a rotor 37 of motor generator MG2 rotate about the same axis.

Power split device PSD is, in the example shown in FIG. 6, a planetary gear, including: a sun gear 51 coupled to a hollow sun gear shaft, with a crank shaft 50 passing through the center of the shaft; a ring gear 52 rotatably supported on the same axis as crank shaft 50; a pinion gear 53, arranged between sun gear 51 and ring gear 53, rotating and revolving around an outer circumference of sun gear 51; and a planetary carrier 54 coupled to an end portion of crank shaft 50 and supporting axis of rotation of each pinion gear 53.

Rotation speed Ne of crank shaft 50 of engine 4 is obtained from an output of rotation speed sensor 202 such as a crank angle sensor.

In power split device PSD, three shafts, that is, a sun gear shaft coupled to sun gear 51, a shaft 60 of ring gear case coupled to ring gear 52, and a crank shaft 50 coupled to planetary carrier 54 serve as power input/output shafts. When power input to/output from two of the three shafts is determined, the power to be input to/output from the remaining one shaft is determined based on the power input to/output from the other two shafts.

A counter drive gear 70 for taking out power is provided on the outside of ring gear case, and rotates integrally with ring gear 52. Counter drive gear 70 is connected to power transmission reduction gear RG. Power is transmitted between counter drive gear 70 and power transmission reduction gear RG. Power transmission reduction gear RG drives a differential gear DEF. Further, driving down hill, rotation of wheels is transmitted to differential gear DEF, and power transmission reduction gear RG is driven by differential gear DEF.

Motor generator MG1 includes a stator 31 forming a rotating magnetic field, and a rotor 32 arranged in stator 31 and having a plurality of permanent magnets embedded therein. Stator 31 includes a stator core 33 and a three-phase coil 34 wound around stator core 33. Rotor 32 is coupled to the sun gear shaft that rotates integrally with sun gear 51 of power split device PSD. Stator core 33 is formed by stacking thin electromagnetic steel sheets and fixed in a case, not shown.

Motor generator MG1 operates as an electric motor for rotating and driving rotor 32 by an interaction between a magnetic field formed by the permanent magnets embedded in rotor 32 and a magnetic field formed by three-phase coil 34. Further, motor generator MG1 further operates as a power generator generating an electromotive force at opposite ends of three-phase coil 34 by the interaction between the magnetic field of permanent magnets and the rotation of rotor 32.

Motor generator MG2 includes a stator 36 forming a rotating magnetic field, and a rotor 37 arranged in stator 36 and having a plurality of permanent magnets embedded therein. Stator 36 includes a stator core 38 and a three-phase coil 39 wound around stator core 38.

Rotor 37 is coupled to a ring gear case rotating integrally with ring gear 52 of power split device PSD. Stator core 38 is formed by stacking thin electromagnetic steel sheets and fixed in a case, not shown.

Motor generator MG2 also operates as a power generator generating an electromotive force at opposite ends of three-phase coil 39 by the interaction between the magnetic field of permanent magnets and the rotation of rotor 37. Further, motor generator MG2 also operates as an electric motor for rotating and driving rotor 37 by an interaction between a magnetic field formed by the permanent magnets and a magnetic field formed by three-phase coil 39.

Figure 7:
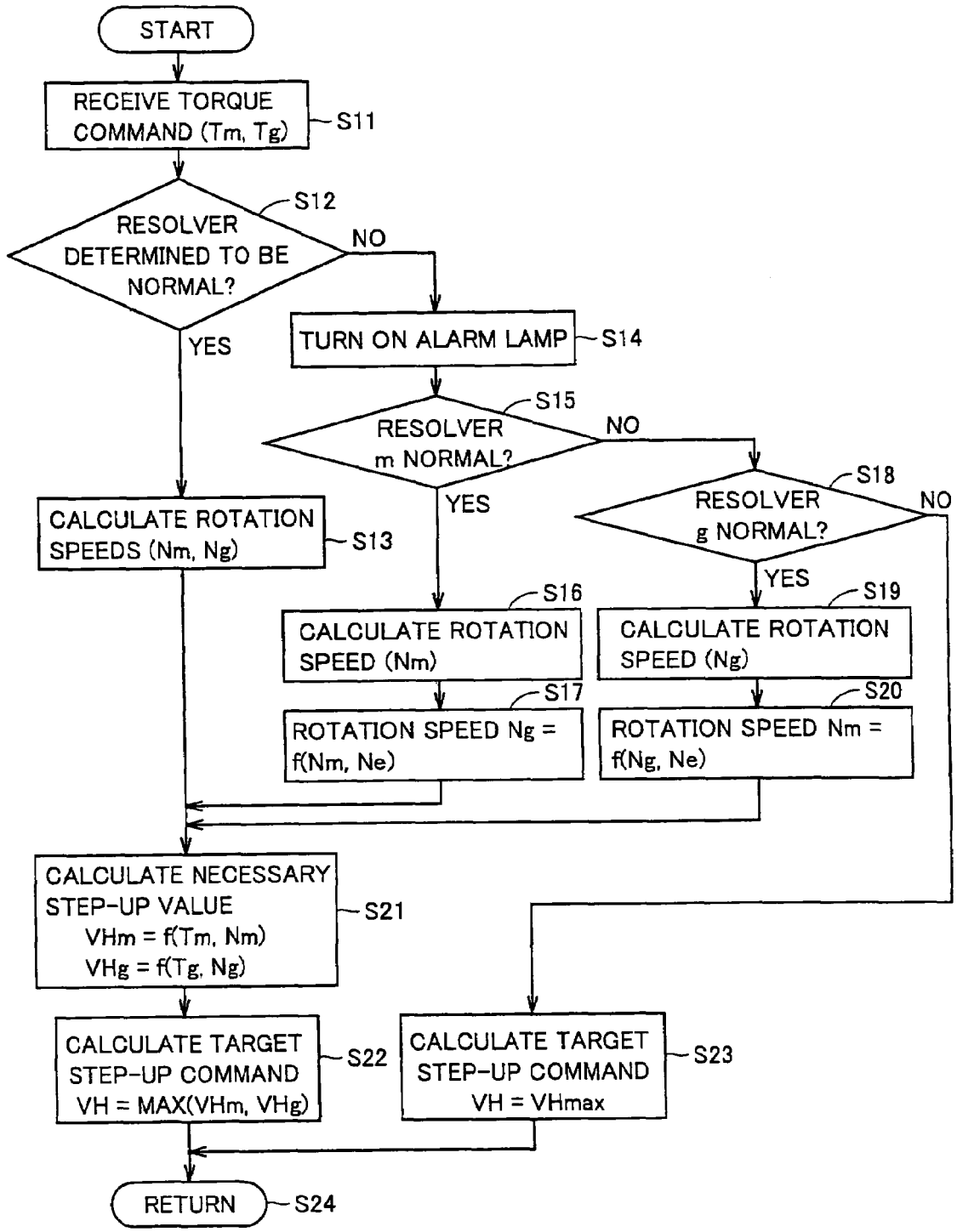
FIG. 7 is a flowchart representing a process structure of a target step-up command calculating process executed by a controller 230 of FIG. 5.

FIG. 7 is a flowchart representing a process structure of a target step-up command calculating process executed by controller 230 of FIG. 5. The process of the flowchart is called from the main routine and executed at every prescribed time interval or every time prescribed conditions are satisfied.

Referring to FIGS. 5 and 7, when the process starts, at step S11, controller 230 receives torque commands Tm and Tg.

At step S12, whether each of resolvers 20 and 21 is normal or not is determined. Determination of resolver is done by determining whether the relation $B^2+C^2=1$ holds between the output signal B of coil LB and output signal C of coil LC or not, as described with reference to FIG. 2.

When it is determined at step S12 that resolvers 20 and 21 are both normal, the process proceeds to step S13. At step S13, controller 230 calculates rotation speeds Nm and Mg, using outputs of resolvers 20 and 21.

If it is determined at step S12 that either one of resolvers 20 and 21 is abnormal, the process proceeds to step S14. At step S14, controller 230 turns on an alarm lamp, to inform the user of the abnormality of the resolver.

At step S15, whether resolver 20 of motor generator MG2 (motor side) is normal or not is determined.

If it is determined at step S15 that resolver 20 on the motor side is normal, controller 230 calculates the rotation speed Nm based on the output of resolver 20 at step S16. Then, at step S17, rotation speed Ng is calculated as a function of engine speed Ne and motor rotation speed Nm.

Figure 8:
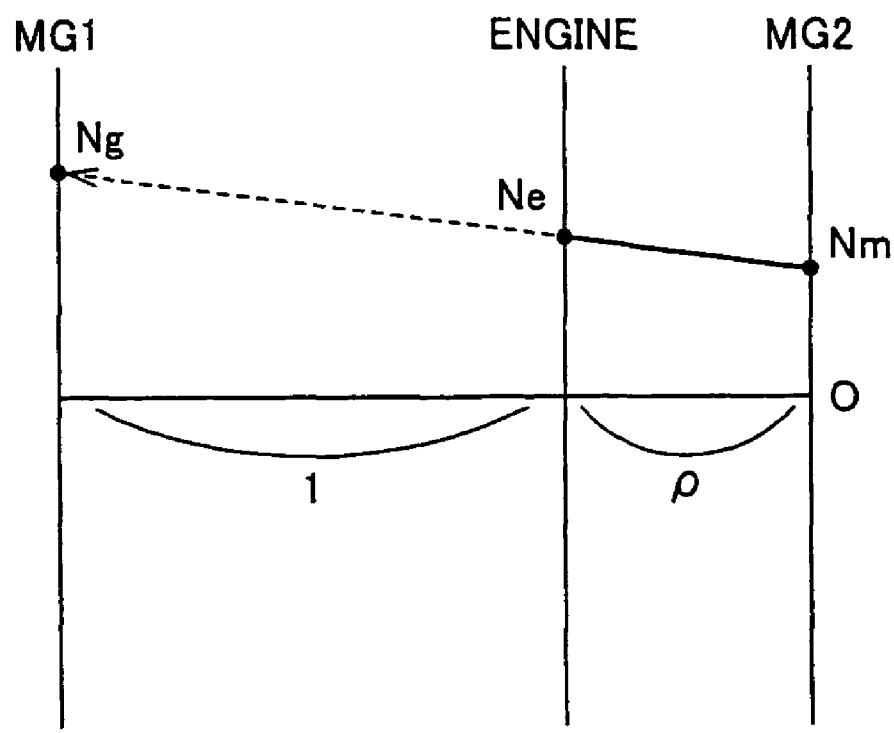
FIG. 8 is a nomograph of the power split device.

FIG. 8 is a nomograph of the power split device.

Referring to FIG. 8, rotation speed Ng of motor generator MG1 is on a line connecting the engine speed Ne and the rotation speed Nm of motor generator MG2. Specifically, vehicle 200 as a hybrid vehicle uses a planetary gear as the power split device, and therefore, the rotation speed of motor generator MG1, engine speed and rotation speed of motor generator MG2 vary in a linked manner to be on one line, as shown in FIG. 8.

As can be seen from FIG. 6, the engine speed Ne is the rotation speed of planetary carrier. The rotation speed Ng of motor generator MG1 is the rotation speed of sun gear 51. The rotation speed Nm of motor generator MG2 is the rotation speed of ring gear 52.

Specifically, because of coupling by the planetary gear, the relation given by the equation (1) below is established among the rotation speed Ng of motor generator MG1, engine speed Ne and the rotation speed Nm of motor generator MG2.

$$Ne=Nm\times 1/(1+\rho)+Ng\times\rho/(1+\rho) \qquad (1)$$

From this equation, when the engine speed Ne and the rotation speed Nm of motor generator MG2 are known, the rotation speed Ng of motor generator MG1 can be calculated. After calculating the rotation speed Ng at step S17, the process proceeds to step S21.

If it is determined at step S15 that resolver 20 of the motor is abnormal, whether resolver 21 on the side of motor generator MG1 (generator side) is normal or not is determined. If it is determined that resolver 21 is normal, the process proceeds to step S19, and the rotation speed Ng is calculated from the output of resolver 21. Next, at step S20, controller 230 calculates the rotation speed Nm as a function of rotation speeds Ng and Ne. In this regard, when rotation speeds Ng and Ne are determined, the rotation speed Nm can be calculated from the same reason as described with reference to FIG. 8.

If the process of step S20 ends, the process of step S21 is executed. If it is determined at step S18 that resolver 21 is also abnormal, it follows that the rotation speed cannot be calculated, and hence, the process proceeds to step S23, at which the target step-up command is set to the maximum value VHmax, as in Embodiment 1. Then, at step S24, the control returns to the main routine.

After execution of the process step S13, S17 or S20, the necessary step-up value is calculated at step S21. As to the calculation of step-up value, using a map such as shown in FIG. 4 corresponding to motor generator MG1, the necessary step-up value VHg on the side of MG1 is calculated from torque command value Tg and rotation speed Ng, and using a map such as shown in FIG. 4 corresponding to motor generator MG2, the necessary step-up value VHm is calculated based on torque command value Tm and rotation speed Nm.

Next, at step S22, either the necessary step-up value VHm or VHg, which is larger, is determined to be the target step-up command VH. Then, the process proceeds to step S24, and control is passed to the main routine.

Based on the description above, Embodiment 2 will be summarized again with reference to FIGS. 5 and 6.

The vehicle includes motor generators MG1 and MG2, inverters 22 and 14 driving motor generators MG1 and MG2, respectively, engine 4, and power split device PSD mechanically coupled to the rotation shaft of motor generator MG1, rotation shaft of motor generator MG2 and crank shaft 50 of engine 4. The power source apparatus of the vehicle includes battery B as an electric storage device, step-up converter 12 stepping up a voltage of the electric storage device and supplying the stepped-up voltage to inverters 14 and 22, and controller 230 indicating a target step-up voltage to step-up converter 12 in accordance with target state of operation of motor generators MG1 and MG2. If it is determined that the current state of operation of one of the motor generators MG1 and MG2 is abnormal, controller 230 estimates, based on the current operation state signal of the other one of motor generators MG1 and MG2 and on a signal representing the state of operation of the engine, a current operation state signal of the one of the motor generators MG1 and MG2.

More preferably, the vehicle further includes resolver 21 detecting rotation speed Ng of the rotor of motor generator MG1, resolver 20 detecting rotation speed Nm of the rotor of motor generator MG2, and rotation speed sensor 202 detecting the rotation speed Ne of crank shaft 50 of engine 4. Power split device PSD includes a planetary gear mechanism, in which when rotations of two shafts are determined, rotation of the other one shaft is forcibly determined.

According to Embodiment 2, when the rotation speed of the electric motor can be calculated by other rotation speed detecting means, the calculated value is used, and therefore, as compared with an approach in which the output voltage of the step-up converter is increased to the maximum value, more efficient running becomes possible.

Embodiment 3

There is a four-wheel-drive hybrid vehicle having a motor for driving rear wheels in addition to a motor for driving front wheels. By driving the rear wheels by a motor independent from the motor for driving the front wheels, a transfer or a propeller shaft, which is essential in a general four-wheel-drive system, becomes unnecessary. This reduces driving loss, and because of the additional effect of regenerative power attained by the motor generator for the rear wheels, more fuel-efficient running than a common four-wheel-drive vehicle can be expected.

Figure 9:
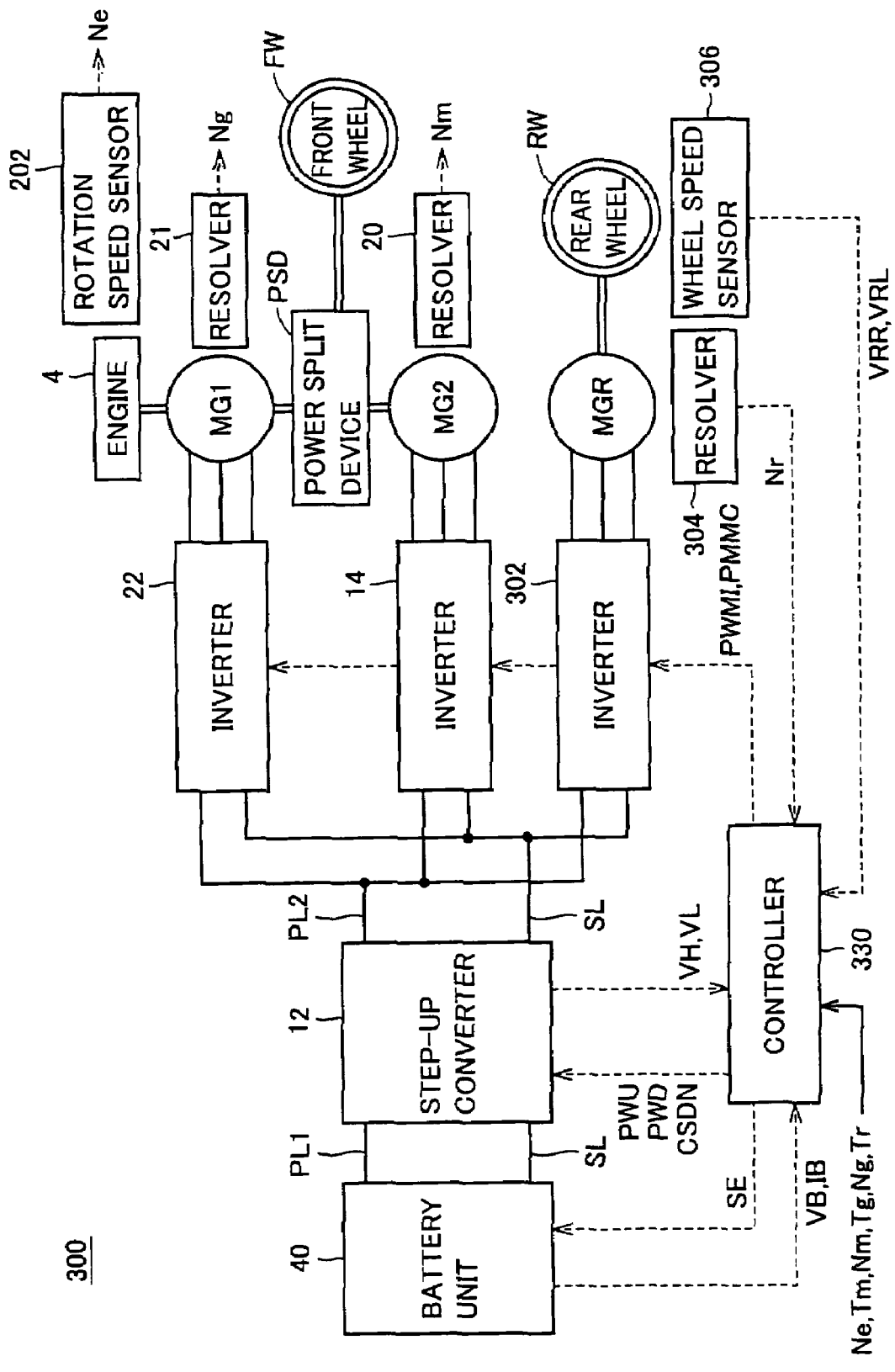
FIG. 9 is a block diagram showing a configuration of a hybrid vehicle 300 in accordance with Embodiment 3.

FIG. 9 is a block diagram showing a configuration of a hybrid vehicle 300 in accordance with Embodiment 3.

Referring to FIG. 9, vehicle 300 includes battery unit 40, step-up converter 12, inverters 14 and 22, motor generators MG1 and MG2, engine 4, power split device PSD, and resolvers 20 and 21. These components are the same as those of vehicle 200 in accordance with Embodiment 2 and, therefore, description thereof will not be repeated.

Vehicle 300 further includes an inverter 302, a motor generator MGR, a resolver 304, a wheel speed sensor 306, and a controller 330.

Inverter 302 is an inverter corresponding to motor generator MGR for driving the rear wheels RW. Resolver 304 detects rotation of a rotor of motor generator MGR. In addition, wheel speed sensor 306 is provided for detecting wheel speeds VRR and VRL of the rear wheels for skid control and the like.

Controller 330 receives torque command values Tm, Tg and Tr, motor rotation speeds Nm, Ng and Nr, engine speed Ne, values of voltages VB, VL and VH and of current IB, and an activation signal IGON.

Here, torque command value Tg and motor rotation speed Ng are related to motor generator MG1, and torque command value Tm and motor rotation speed Nm are related to motor generator MG2. Torque command value Tr and motor rotation speed Nr are related to motor generator MGR.

Further, voltage VB is the voltage of battery B, and current IB is the current flowing through battery B. Voltage VL is the voltage before step up by step-up converter 12, and voltage VH is the voltage after step-up by step-up converter 12.

Controller 330 outputs a control signal PWU instructing step-up converter 12 to step up the voltage, a control signal PWD to step down the voltage, and a signal CSDN instructing an operation inhibition.

Further, controller 330 outputs, to each of inverters 22, 14 and 302, a driving instruction PWMI for converting the DC voltage VH as an output of step-up converter 12 to an AC voltage for driving the motor generator, and a regeneration instruction PWMC for converting an AC voltage generated by the motor generator to a DC voltage and returning the same to the side of step-up converter 12.

Battery unit 40, step-up converter 12 and controller 330 constitute the power source apparatus for the vehicle, for supplying power to inverters 14, 22 and 302 and motor generators MG1, MG2 and MGR as loads of the vehicle.

Figure 10:
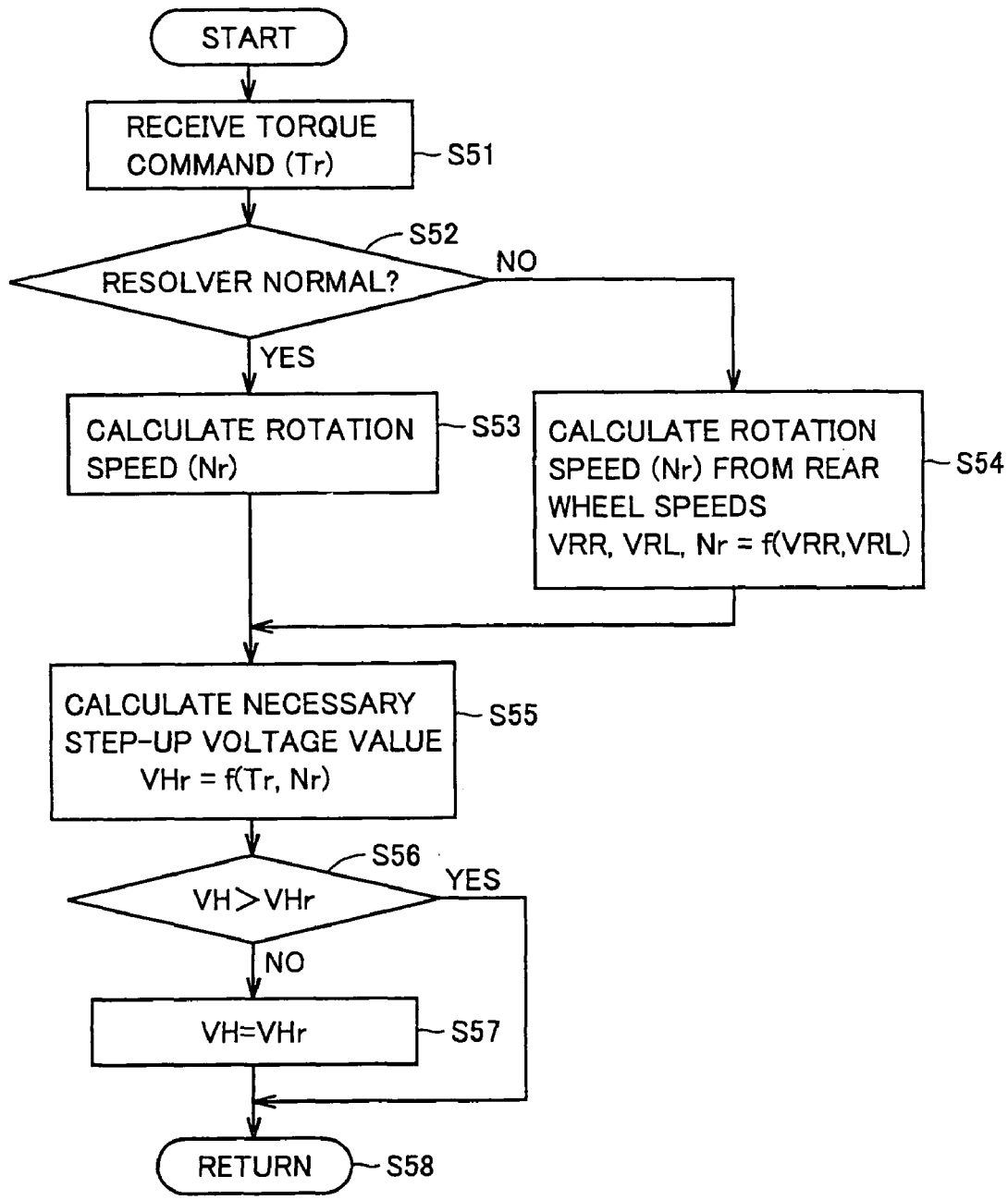
FIG. 10 is a flowchart representing a process for calculating the step-up command value executed by a controller 330 of FIG. 9.

FIG. 10 is a flowchart representing a process for calculating the step-up command value executed by controller 330 of FIG. 9.

Referring to FIGS. 9 and 10, controller 330 executes the process shown in the flowchart of FIG. 10, following the process for motor generators MG1 and MG2 described above with reference to FIG. 7.

When the process starts, at step S51, torque command Tr for motor generator MGR is received. At step S52, whether resolver 304 detecting rotation of motor generator MGR is normal or not is determined. The determination is made in the similar manner as determination of resolver 20 described with reference to Embodiment 1.

If it is determined at step S52 that the output of resolver 304 is normal, controller 330 calculates the rotation speed Nr from the output of resolver 304. If it is determined at step S52 that the output of resolver 304 is abnormal, the process proceeds to step S54.

At step S54, using wheel speeds VRR and VRL detected by wheel speed sensor 306 of the rear wheels, the rotation speed Nr is calculated as a function of these. After the end of process step S53 or S54, the process proceeds to step S55.

At step S55, based on a map for motor generator MGR similar to that of FIG. 4, the necessary step-up value VHr is calculated. At step S56, the magnitude of target step-up command VH calculated in accordance with the flowchart of FIG. 7 is compared with necessary step-up value VHr calculated at step S55. When the relation VH>VHr is not satisfied here, the process proceeds to step S57, at which the target step-up value VH is set to VHr. If the target step-up value calculated at step S56 is higher than the necessary step-up value calculated at step S55, the process directly proceeds to step S58, and the process is passed to the main routine.

Based on the description above, Embodiment 3 will be summarized again with reference to FIG. 9.

Vehicle 300 includes a plurality of motor generators MG1, MG2 and MGR that rotate in coordination with the speed of the vehicle, and a plurality of inverters 22, 14 and 302 driving motor generators MG1, MG2 and MGR, respectively. The power source apparatus of the vehicle includes battery unit 40 as an electric storage device, step-up converter 12 stepping up the voltage of the electric storage device and supplying a common stepped-up voltage to the plurality of inverters, and controller 330 calculating the highest of necessary voltages for motor generators MG1, MG2 and MGR from the target state of operation of motor generators MG1, MG2 and MGR, and indicating the highest voltage as the target step-up voltage to step-up converter 12. When it is determined that at least one of the signals representing current states of operations of motor generators MG1, MG2 and MGR is abnormal, controller 330 increases the target step-up voltage to the maximum value.

Preferably, vehicle 300 includes resolvers 20 and 21 and rotation speed sensor 202, as a plurality of rotation speed sensors detecting rotation speeds of rotors in the plurality of rotating electrical machines. Controller 330 determines that the operation state signal is abnormal, when at least one of the outputs from the plurality of rotation speed sensors does not satisfy prescribed conditions.

According to another aspect, Embodiment 3 may also be summarized as follows. The vehicle includes wheel speed sensor 306 as a detecting unit detecting the vehicle speed, motor generators MG1, MG2 and MGR as a plurality of rotating electrical machines rotating in coordination with the vehicle speed, and a plurality of inverters 22, 14 and 302 driving the plurality of rotating electrical machines, respectively. The power source apparatus of the vehicle includes battery unit 40 as an electric storage device, step-up converter 12 stepping up a voltage of the electric storage device and supplying a common stepped-up voltage to the plurality of inverters 22, 14 and 302, and controller 330 calculating the highest voltage among the necessary voltages of the plurality of rotating electrical machines from the target state of operations of the plurality of rotating electrical machines, and indicating the highest voltage as the target step-up voltage to step-up converter 12. When it is determined that at least one of the signals representing current states of operations of the plurality of rotating electrical machines is abnormal, controller 330 calculates a normal operation state signal from the output of wheel speed sensor, and uses the same for determining the target step-up voltage.

As described above, in Embodiment 3, even when the target operating point is abnormal in a vehicle mounting a plurality of motor generators, it is possible to prevent the output voltage of the step-up converter from becoming lower than the back electromotive voltage, and hence, erroneous regenerative braking is prevented and deterioration of controllability can be avoided.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A power source apparatus for a vehicle including a first rotating electrical machine and an inverter driving said first rotating electrical machine, comprising:
   an electric storage device;
   a voltage converting unit stepping up a voltage of said electric storage device and supplying the stepped-up voltage to said inverter; and
   a controller indicating a target step-up voltage to said voltage converting unit in accordance with a first operation state signal representing a state of operation of said first rotating electrical machine; wherein
   said controller determines said target step-up voltage to maintain operation of said voltage converting unit without using said first operation state signal when said first operation state signal is determined to be abnormal, wherein
   said controller sets said target step-up voltage to a highest settable value when said first operation state signal is determined to be abnormal.

2. The power source apparatus for a vehicle according to claim 1, wherein
   said vehicle further includes
   a first rotation speed sensor detecting rotation speed of a rotor of said first rotating electrical machine; and
   said controller determines that said first operation state signal is abnormal when an output of said first rotation speed sensor does not satisfy a prescribed condition.

3. The power source apparatus for a vehicle according to claim 1, wherein
   said first rotating electrical machine includes a coil;
   said vehicle further includes a current sensor detecting a current flowing through said coil; and
   said controller determines that said first operation state signal is abnormal, when an output of said current sensor does not satisfy a prescribed condition.

4. The power source apparatus for a vehicle according to claim 1, wherein
   said vehicle includes
   a plurality of rotating electrical machines;
   said first rotating electrical machine is one of said plurality of rotating electrical machines;
   said inverter includes a plurality of inverter units driving said plurality of rotating electrical machines respectively;
   said voltage converting unit steps up a voltage of said electric storage device and supplies a common stepped-up voltage to said plurality of inverter units;
   said controller calculates a highest voltage among a plurality of voltages required by said plurality of rotating electrical machines respectively, based on states of operations of said plurality of rotating electrical machines, and indicates said highest voltage as a target step-up voltage to said voltage converting unit; and when it is determined that any one of a plurality of operation state signals respectively representing states of operations of said plurality of rotating electrical machines is abnormal, said controller increases said target step-up voltage to a highest settable value.

5. The power source apparatus for a vehicle according to claim 4, wherein
said vehicle includes
a plurality of rotation speed sensors respectively detecting rotation speeds of rotors of said plurality of rotating electrical machines; and
when an output of at least one of said plurality of rotation speed sensors does not satisfy a prescribed condition, said controller determines that an operation state signal of the corresponding rotating electrical machine is abnormal.

6. A vehicle, comprising:
a first rotating electrical machine;
an inverter driving said first rotating electrical machine; and
a power source apparatus; wherein
said power source apparatus includes
an electric storage device,
a voltage converting unit stepping up a voltage of said electric storage device and supplying it to said inverter, and
a controller indicating a target step-up voltage to said voltage converting unit in accordance with a first operation state signal representing a state of operation of said first rotating electrical machine and
said controller determines said target step-up voltage to maintain operation of said voltage converting unit without using said first operation state signal when it is determined that said first operation state signal is abnormal.

7. A method of controlling a power source apparatus for a vehicle including a first rotating electrical machine and an inverter driving said first rotating electrical machine, wherein
said power source apparatus includes
an electric storage device, and
a voltage converting unit stepping up a voltage of said electric storage device and supplying the stepped-up voltage to said inverter;
said control method comprising the steps of:
indicating a target step-up voltage to said voltage converting unit in accordance with a first operation state signal representing a state of operation of said first rotating electrical machine; and
determining said target step-up voltage to maintain an operation of said voltage converting unit without using said first operation state signal when said first operation state signal is determined to be abnormal, wherein
in said step of maintaining the operation of said voltage converting unit, said target step-up voltage is set to a highest settable value when said first operation state signal is determined to be abnormal.

8. The method of controlling a power source apparatus for a vehicle according to claim 7, wherein
said vehicle further includes a first rotation speed sensor detecting rotation speed of a rotor of said first rotating electrical machine;
said control method further comprising the step of
determining that said first operation state signal is abnormal when an output of said first rotation speed sensor does not satisfy a prescribed condition.

9. The method of controlling a power source apparatus for a vehicle according to claim 7, wherein
said first rotating electrical machine includes a coil;
said vehicle further includes a current sensor detecting a current flowing through said coil;
said control method further comprising the step of
determining that said first operation state signal is abnormal when an output of said current sensor does not satisfy a prescribed condition.

10. The method of controlling a power source apparatus for a vehicle according to claim 7, wherein
said vehicle includes a plurality of rotating electrical machines;
said first rotating electrical machine is one of said plurality of rotating electrical machines;
said inverter includes a plurality of inverter units driving said plurality of rotating electrical machines, respectively;
said voltage converting unit steps up a voltage of said electric storage device and supplies a common stepped-up voltage to said plurality of inverter units;
said control method further comprising the steps of:
calculating a highest voltage among a plurality of voltages required by said plurality of rotating electrical machines, respectively, based on states of operations of said plurality of rotating electrical machines, and indicating said highest voltage as a target step-up voltage to said voltage converting unit; and
increasing said target step-up voltage to a highest settable limit value when it is determined that any one of a plurality of operation state signals respectively representing states of operations of said plurality of rotating electrical machines is abnormal.

11. The method of controlling a power source apparatus for a vehicle according to claim 10, wherein
said vehicle includes a plurality of rotation speed sensors respectively detecting rotation speeds of rotors of said plurality of rotating electrical machines;
said control method further comprising the step of
determining that an operation state signal of the corresponding rotating electrical machine is abnormal when an output of at least one of said plurality of rotation speed sensors does not satisfy a prescribed condition.

* * * * *